United States Patent [19]

Chou

[11] Patent Number: 5,193,099
[45] Date of Patent: Mar. 9, 1993

[54] DIODE LASER COLLIMATTING DEVICE
[75] Inventor: Chia-Li Chou, Taipei, Taiwan
[73] Assignee: Quarton, Inc., Taiwan
[21] Appl. No.: 795,792
[22] Filed: Nov. 21, 1991
[51] Int. Cl.[5] .......................... G02B 6/00; H01S 3/08; H01S 3/11
[52] U.S. Cl. ..................................... 372/107; 385/86; 174/52.6
[58] Field of Search .......................... 372/99, 103, 107; 385/86-90; 174/52 P; 361/427-428; 357/17, 19, 25, 30

[56] References Cited

U.S. PATENT DOCUMENTS

| | | | |
|---|---|---|---|
| 4,050,037 | 9/1977 | Knowles et al. | 372/107 |
| 4,730,335 | 4/1988 | Clark et al. | 372/107 X |
| 4,785,462 | 11/1988 | Keil | 372/107 X |
| 4,858,240 | 8/1989 | Pohler et al. | 372/89 X |
| 5,001,722 | 3/1991 | Klement et al. | 372/107 X |
| 5,111,476 | 5/1992 | Hollenbeck et al. | 372/107 |

Primary Examiner—Akm E. Ullah
Attorney, Agent, or Firm—Bacon & Thomas

[57] ABSTRACT

A diode laser collimatting device comprising a laser collimatting socket mounted on a socket holder through plug-in connection with a plastic lens retained therebetween in position, a laser diode inserted in said socket holder, an exciter circuit board inserted in said socket holder and connected to said laser diode, and a contact spring inserted in said socket holder and connected to said exciter circuit board, and wherein inserting said laser diode into said socket holder causes said socket holder, said laser diode, said exciter circuit board, said contact spring and said power supply to form into a circuit permitting said laser diode to be excited by said exciter circuit board to emit light through said plastic lens and said laser collimatting socket; a grid is fastened in said center hole to filtrate the light beam produced from said laser diode.

3 Claims, 5 Drawing Sheets (a)

(b)

(c)

DIODE LASER COLLIMATTING DEVICE

BACKGROUND AND SUMMARY OF THE INVENTION

The present invention relates to diode laser collimatting devices and relates more particularly to a diode laser collimatting device which can be conveniently assembled to provide a fixed focal length.

Laser diode has been widely used in light collimatting devices. For example, in laser sighting devices and beacon pens, laser diode has been commonly used as a light emitting element. FIG. 1 illustrates a diode laser collimatting device according to the prior art which is generally comprised of a laser collimatting socket (1) having a lens (3), which is made from glass material, fastened in a light collimatting hole (2) through the central axis thereof, and a socket holder (5) having a laser diode (7) fastened therein. The laser collimatting socket (1) has an outer thread (4) inserted into an inner thread (6) on the socket holder (5). By rotating the laser collimatting socket (1) on the socket holder (5), the focal length of the diode laser collimatting device is adjusted. If a lens is made from glass material it should be treated through manual grinding process so as to provide a smooth surface for focusing. Therefore, the focal length of one lens may vary with another. After assembly, the focal length of each diode laser collimatting device must be properly adjusted. As indicated, the lens (3) and the laser diode (7) are respectively fastened in two separate parts, namely, the laser collimatting socket (1) and the socket holder (5), the lens (3) and the light beam from the laser diode (7) may have different concentricity which affects the focusing of the lens (3). Further, according to the property of laser diode in emitting a light, the image produced from a laser diode covers 6°-10° horizontally and 20°-40° vertically, i.e. the image disperses outwards like a transverse strip, and the size of the image is directly proportional to the distance from the laser diode. In order to focus the whole image from a laser diode, bigger lens shall be used. Using a bigger lens in a diode laser collimatting device simultaneously increases the cost of the device.

The present invention has been accomplished to eliminate the aforesaid problems. It is therefore the main object of the present invention to provide a diode laser collimatting device which is inexpensive to manufacture and easy to assemble. It is another object of the present invention to provide a diode laser collimatting device which is practical in use without adjusting focal length and is water-proof and shock-resisting.

DETAILED DESCRIPTION OF THE PRESENT INVENTION

Figure 1:
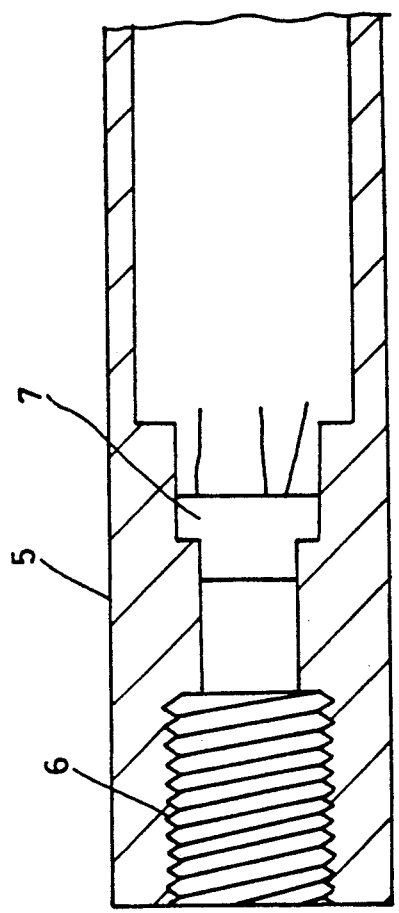
FIG. 1 illustrates a prior art structure of diode laser collimatting device.
Figure 1:
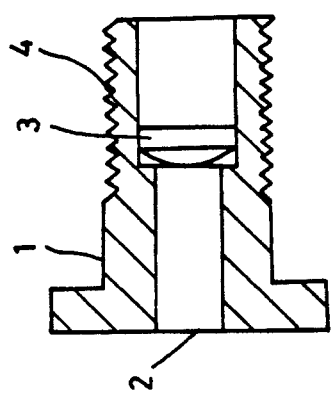
Figure 2:
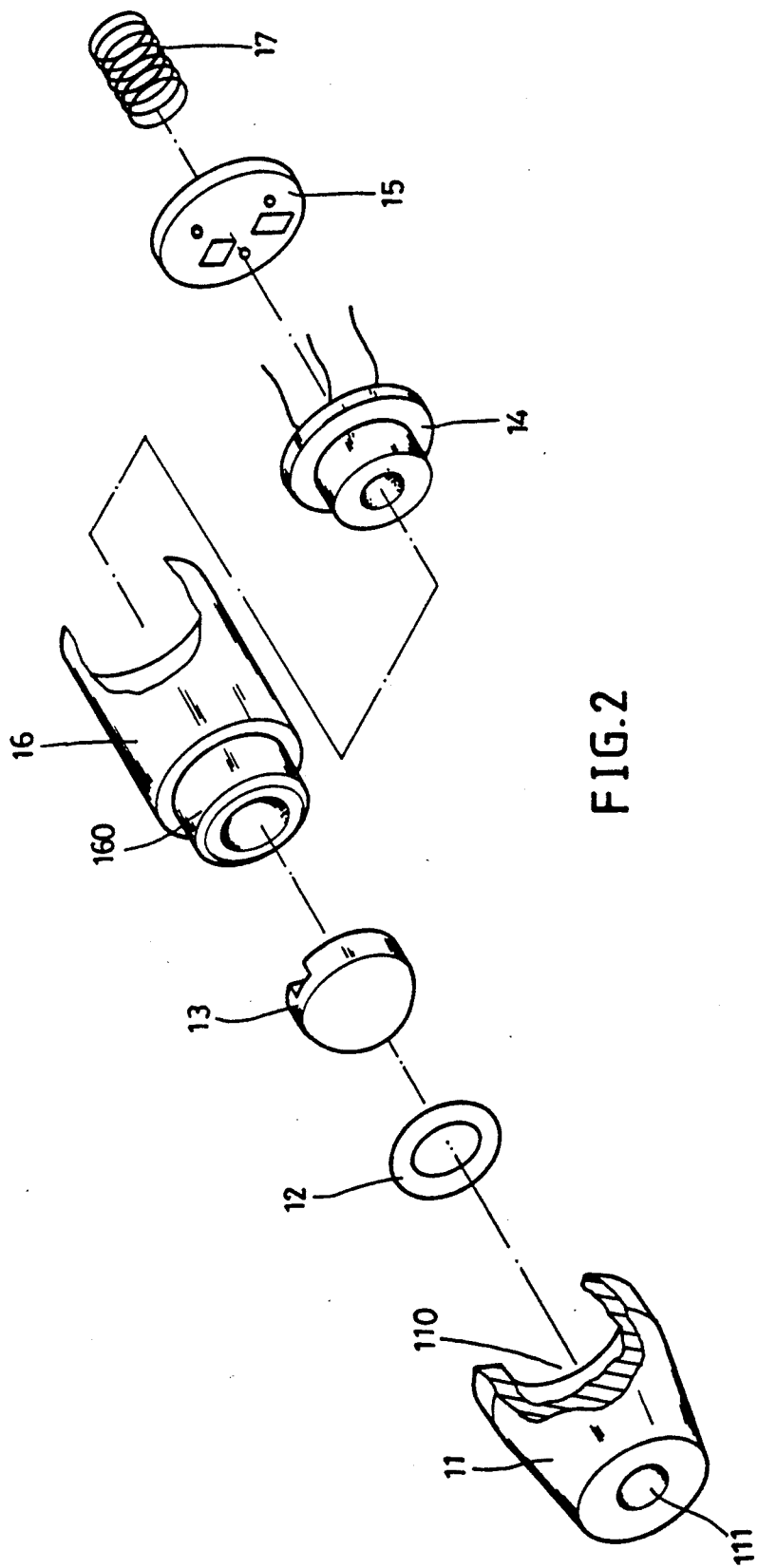
FIG. 2 is an exploded perspective view of the preferred embodiment of the diode laser collimatting device of the present invention.
Figure 3:
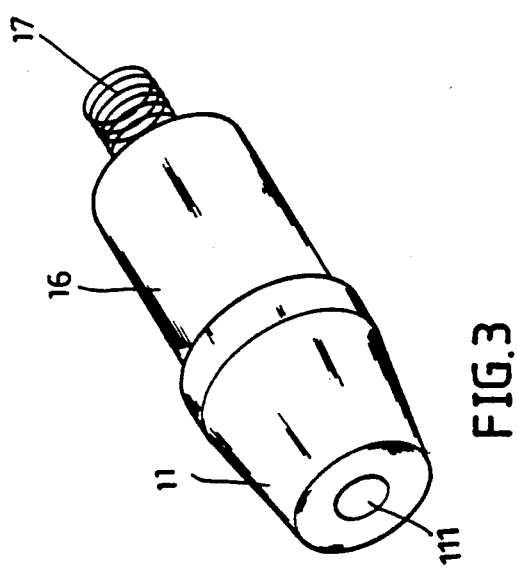
FIG. 3 illustrates the outer appearance of the preferred embodiment of the diode laser collimatting device of the present invention.

Referring to FIG. 2, a diode laser collimatting device as constructed in accordance with the present invention is generally comprised of a laser collimatting socket 11, a rubber ring 12, a plastic lens 13, a socket holder 16, a laser diode 14, an exciter circuit board 15, and a contact spring 17. The laser collimatting socket 11 is made from a hollow, truncated cone defining therein a receiving chamber 110 for holding the rubber ring 12 and the plastic lens 13, and having a center hole 111 on the front end for the passing therethrough of the laser beam which is emitted by the laser diode 14 through the plastic lens 13. The socket holder 16 is made from a hollow metal tube, having a tubular projection 160 at the front in reduced outer diameter for holding the laser collimatting socket 11. The laser diode 14, the exciter circuit board 15 and the contact spring 17 are respectively fastened inside the socket holder 16 in proper order, wherein the pins of the laser diode 14 are directly welded to the exciter circuit board 15; the contact spring 17 is connected to the negative terminal of the exciter circuit board 15. The plastic lens 13 is made from plastic resin through injection molding process, therefore, constant quality can be achieved. Because mass production is possible, the cost of the plastic lens is cheap. After the rubber ring 12 and the plastic lens 13 are respectively inserted in the receiving chamber 110 of the laser collimatting socket 11 with the plastic lens 13 disposed behind the rubber ring 12, the laser collimatting socket 11 is mounted on the tubular projection 160 of the socket holder. Because the outer diameter of the tubular projection 160 is made to tightly fit into the inner diameter of the receiving chamber 110 in the laser collimatting socket 11, the plastic lens 13 is tightly secured to the front end of the socket holder 16 once the laser collimatting socket 11 has been attached to the tubular projection 160 of the socket holder 16. Therefore, the plastic lens 13 and the socket holder 16 have the same concentricity. Further, the arrangement of the rubber ring 12 can seal off moisture and also absorb possible shock waves. As indicated, the plastic lens 13 is made through mass production process, a fixed focal length can be constantly obtained. Therefore, adjusting focal length can be made by changing the length of the tubular projection 160 on the socket holder 16. These arrangements make the present invention more easy to manufacture and assemble and, at the same time, the manufacturing cost of the present invention can be greatly reduced.

After the laser diode 14, the exciter circuit board 15 and the spring 17 are respectively connected together and fastened inside the socket holder 16, the metal shell of the socket holder 16 is connected to the positive terminal of the exciter circuit board 15 by a pin on the outer shell of the laser diode 14, and therefore, the positive terminal of a battery set can be connected through the socket holder, the laser diode 14 to the positive terminal of the exciter circuit board 15 via a switch and, the negative terminal of said battery set can be connected to the negative terminal of the exciter circuit board 15 through the contact spring 17. Therefore, the diode laser collimatting device is made in a unitary set which is replaceable like a lamp bulb without any external control circuit or exciter. Once power supply is connected, the laser diode 14 immediate emits light through the laser collimatting socket 11.

Figure 4:
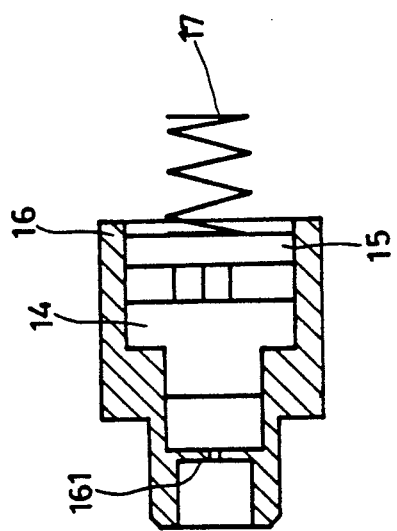
FIG. 4 is a sectional plan view of the fastening socket.
Figure 5:
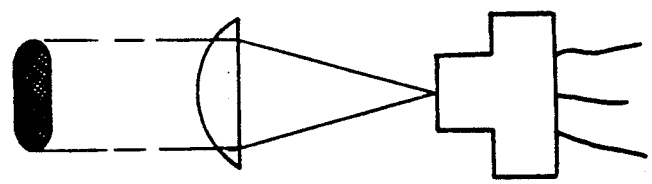
FIGS. 5(a), (b), and (c) are a comparison chart showing the projection result between the present invention and the prior art.
Figure 5:
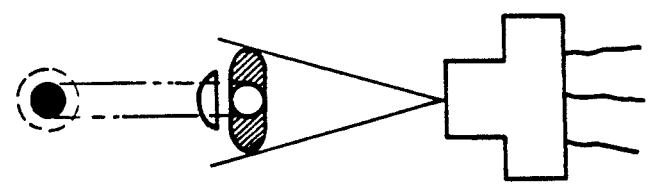
Figure 5:
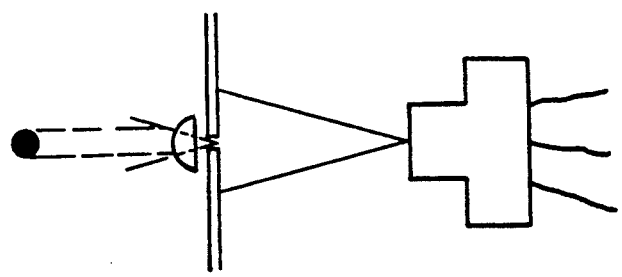

Further, because the use of the inexpensive plastic lens 13 which provides long focal length and focuses only the center part of the light beam produced by the laser diode, the image projected through the present invention is shaped like a circle of similitude. In comparison with the image projected by a prior art laser collimatting device as shown in FIG. 5-(a), the image projected by the present invention is better condensed. However, because the plastic lens 13 focuses only the center part of the light beam produced by the laser diode, a ring of light will be simultaneously produced around the image projected (see FIG. 5(b)). This problem can be eliminated by setting a grid 161 (see FIG. 4) in front of the laser diode 14, which grid 161 permits only the central part of the light beam produced by the laser diode 14 to pass therethrough. After the installation of the grid 161, only a unitary spot of image is projected through the diode laser collimatting device of the present invention (see FIG. 5-(c)).

What is claimed is:

1. A diode laser collimatting device, the improvement comprising:

a laser collimatting socket made from a hollow, truncated cone defining therein a receiving chamber and having a center hole on the front end through the central axis thereof;

a socket holder made from a hollow metal tube having a tubular projection at the front tightly inserted into said receiving chamber in said laser collimatting socket, said socket holder being connected to a power supply at the positive terminal thereof;

a plastic lens mounted on said tubular projection at the front and received inside said receiving chamber;

a rubber ring to seal the gap between the inner wall surface of said laser collimatting socket and the outer wall surface of said tubular projection;

an exciter circuit board inserted in said socket holder;

a laser diode inserted in said socket holder in front of said exciter circuit board, said laser diode having connecting pins respectively connected to said exciter circuit;

a contact spring connected to said exciter circuit at the back, said contact spring having one end connected to the negative terminal of said exciter circuit and an opposite end connected to said power supply; and wherein inserting said laser diode into said socket holder causes said socket holder, said laser diode, said exciter circuit board, said contact spring and said power supply to form into a circuit permitting said laser diode to be excited by said exciter circuit board to emit light through said plastic lens and said laser collimatting socket.

2. The diode laser collimatting device of claim 1, which further comprises a grid fastened in the center hole in said laser collimatting socket to filtrate the light beam produced by said laser diode permitting only the central part of the light beam to pass therethrough.

3. The diode laser collimatting device of claim 1, wherein said socket holder and said laser collimatting socket are firmly connected together through plug-in connection.

* * * * *

REEXAMINATION CERTIFICATE (2672nd)

United States Patent [19]
Chou

[11] B1 5,193,099
[45] Certificate Issued Sep. 12, 1995

[54] DIODE LASER COLLIMATING DEVICE

[75] Inventor: Chia-Li Chou, Taipei, Taiwan

[73] Assignee: Quarton Inc., Taiwan

Reexamination Request:
No. 90/003,567, Sep. 13, 1994

Reexamination Certificate for:
Patent No.: 5,193,099
Issued: Mar. 9, 1993
Appl. No.: 795,792
Filed: Nov. 21, 1991

[51] Int. Cl.$^6$ .......................... G02B 6/00; H01S 3/08; H01S 3/11
[52] U.S. Cl. ...................... 372/107; 385/86; 174/52.6
[58] Field of Search ............. 385/46; 174/52.6

[56] References Cited

U.S. PATENT DOCUMENTS

| | | | |
|---|---|---|---|
| 3,045,111 | 7/1962 | Hoenig | 362/111 X |
| 4,411,500 | 10/1983 | Yonezawa et al. | 372/43 X |
| 4,763,334 | 8/1988 | Shimada et al. | 372/29 |
| 4,883,926 | 11/1989 | Baldwin | 178/18 |
| 4,918,702 | 4/1990 | Kimura | 372/34 |
| 4,948,210 | 8/1990 | Simms | 350/1.4 |
| 5,056,097 | 10/1991 | Meyers | 372/38 |
| 5,121,188 | 6/1992 | Patridge et al. | 357/74 |

*Primary Examiner*—Akm E. Ullah

[57] ABSTRACT

A diode laser collimatting device comprising a laser collimatting socket mounted on a socket holder through plug-in connection with a plastic lens retained therebetween in position, a laser diode inserted in said socket holder, an exciter circuit board inserted in said socket holder and connected to said laser diode, and a contact spring inserted in said socket holder and connected to said exciter circuit board, and wherein inserting said laser diode into said socket holder causes said socket holder, said laser diode, said exciter circuit board, said contact spring and said power supply to form into a circuit permitting said laser diode to be excited by said exciter circuit board to emit light through said plastic lens and said laser collimatting socket; a grid is fastened in said center hole to filtrate the light beam produced from said laser diode.

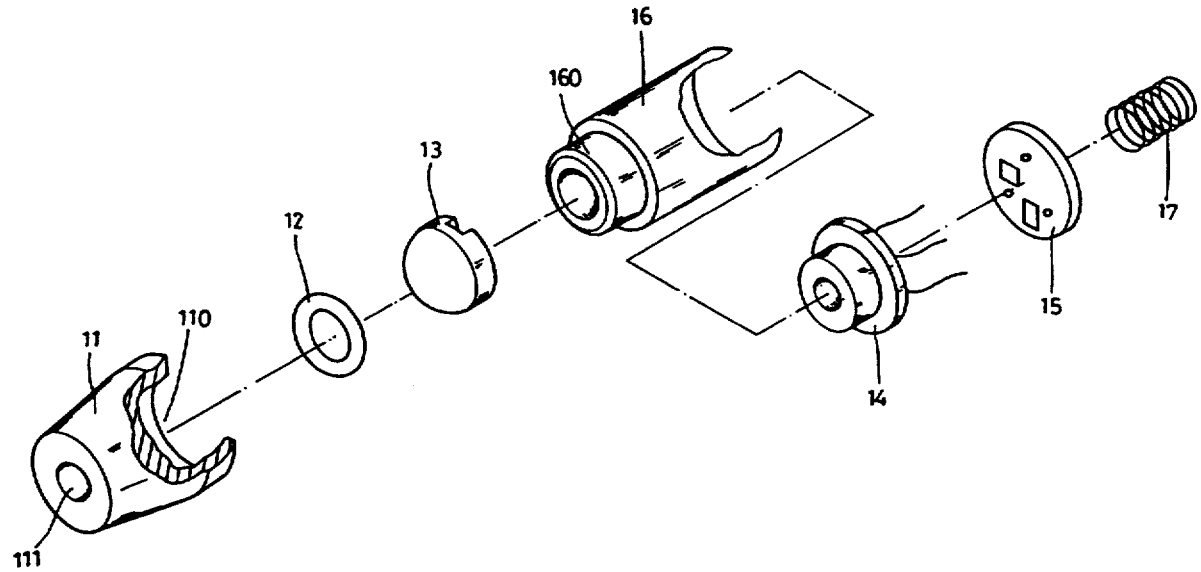

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *